United States Patent [19]

Bruinsma

[11] Patent Number: 4,693,629

[45] Date of Patent: Sep. 15, 1987

[54] FASTENER FOR JOINING PANELS TO EACH OTHER

[75] Inventor: Robert F. Bruinsma, Northridge, Calif.

[73] Assignee: Datron Systems, Inc., Simi Valley, Calif.

[21] Appl. No.: 801,415

[22] Filed: Nov. 25, 1985

[51] Int. Cl.$^4$ .............................. F16B 3/00; F04C 1/30
[52] U.S. Cl. .................................... 403/170; 403/219; 403/362; 403/408.1; 52/584
[58] Field of Search ............... 403/217, 218, 219, 174, 403/178, 170, 172, 176, 171, 175, 362, 408.1; 52/81, 80, 584, 127.5, 126.6, 126.5

[56] References Cited

U.S. PATENT DOCUMENTS

| | | | |
|---|---|---|---|
| 2,498,568 | 2/1950 | Mosebach | 403/218 |
| 3,105,969 | 10/1963 | Banche et al. | 52/81 |
| 3,370,871 | 2/1968 | Piarotto | 403/219 |
| 3,945,160 | 3/1976 | Grosser et al. | 52/82 |
| 4,021,128 | 5/1977 | Chiames | 403/217 |
| 4,438,610 | 3/1984 | Fifer | 52/126.6 X |
| 4,474,490 | 10/1984 | Harper, Jr. | 403/218 |
| 4,512,699 | 4/1985 | Jackson et al. | 403/408.1 |
| 4,533,277 | 8/1985 | Alexander et al. | 403/408.1 |
| 4,541,210 | 9/1985 | Cook | 52/80 |
| 4,577,448 | 3/1986 | Howorth | 403/408.1 |
| 4,578,910 | 4/1986 | Germeroth et al. | 52/584 X |

FOREIGN PATENT DOCUMENTS 0131370 1/1985 European Pat. Off. ............ 403/218

Primary Examiner—Cornelius J. Husar
Assistant Examiner—Peter M. Cuomo
Attorney, Agent, or Firm—Edward A. Sokolski

[57] ABSTRACT

A fastener for joining together a plurality of panel members at their corners provides tight, aligned joinder between the panels, yet can be rapidly disconnected to facilitate the transportation of the panels. The fastener includes a central hub portion against which the corner portions of the panels to be joined together abut in mating relationship; the corner portions of such panels being preformed to the shape of the fastener central portion to enable such mating engagement. Extending from one end of the central portion is an overlapping member which fits flush against one surface of the panels to be joined while extending from the opposite end of the central portion is a second member which is in opposing relationship to the opposite surface of such panels. Clamping members attached to the second member have arms which extend towards each other at convergent angles. The panels each have notches formed therein into which the ends of the arms extend and abut in clamping engagement with the panels, thereby retaining such panels to the fastener and to each other.

7 Claims, 6 Drawing Figures

FASTENER FOR JOINING PANELS TO EACH OTHER

This invention relates to fasteners for joining panels together and more particularly, to such a fastener capable of joining a plurality of panels together at their corners in an aligned relationship.

A situation is commonly represented where a plurality of similar panel units must be repeatedly assembled and disassembled to form a temporary structure which needs to be used at a number of different locations. The transportation of the structure thus is facilitated by disassembling the panels and reassembling them at the new location. A particular application for this type of fastener is in the assembly of large parabolic reflectors for microwave antennas to be used in the field. In the assembly of this type of structure, it is essential that the panels be precisely aligned with each other and retained in the aligned position while the device is in use at a particular location. A number of prior art clamps have been designed for accomplishing this end result. These have been found, however, to have several shortcomings. First, such clamps often require close manufacturing tolerances on a number of parts employed to assure proper alignment of the panel surfaces. Other such clamping arrangements require a separate clamp for each panel junction. In addition, a number of prior art clamps are built into the panels and are somewhat more difficult to install and replace than would be desired. In addition, in using some of the prior art clamping devices, it is necessary to employ a separate aligning device to properly position the panels in alignment with each other.

The device of the present invention overcomes these shortcomings of the prior art by providing a clamp which is capable of joining two or more panels together with a single clamp. Further, the clamps of the present invention are separate and apart from the panel structures and, are relatively easy to install and replace. In addition, in the fasteners of the present invention, no special aligning devices are needed to position the panels, such panels being accurately aligned with each other by the fastener itself. Further, in the device of the present invention, all close manufacturing tolerances are confined to a single unitary part which facilitates the manufacture of the device.

Briefly described, the devices of the invention include a central hub portion against which the corner portions of the panels to be joined together abut in mating relationship; these corners being shaped to matingly engage the surfaces of the central hub portion of the fastener. Extending transversely from one end of the central hub portion, is an overlapping portion which abuts against one of the surfaces of the panels to be joined.

A clamp member is provided for each of the panel sections. One end of each of these clamp members fits into a notch portion of an associated panel, these end portions extending towards each other at converging angles. The clamping members are each tightened against their associated notch portions to drive the corners of the panel sections towards each other and in tight abutment against the central hub portion and overlapping portion of the fastener.

It is therefore an object of this invention to provide an improved fastener for joining a plurality of panels together at their corners in close alignment with each other.

It is a further object of this invention to provide a simple and economical fastener for joining together a plurality of panel sections at their corners.

It is still a further object of this invention to provide a fastener member which can be employed to rapidly assemble and disassemble a plurality of panel sections.

Other objects of this invention will become apparent as the description proceeds in connection with the accompanying drawings of which:

Figure 1:
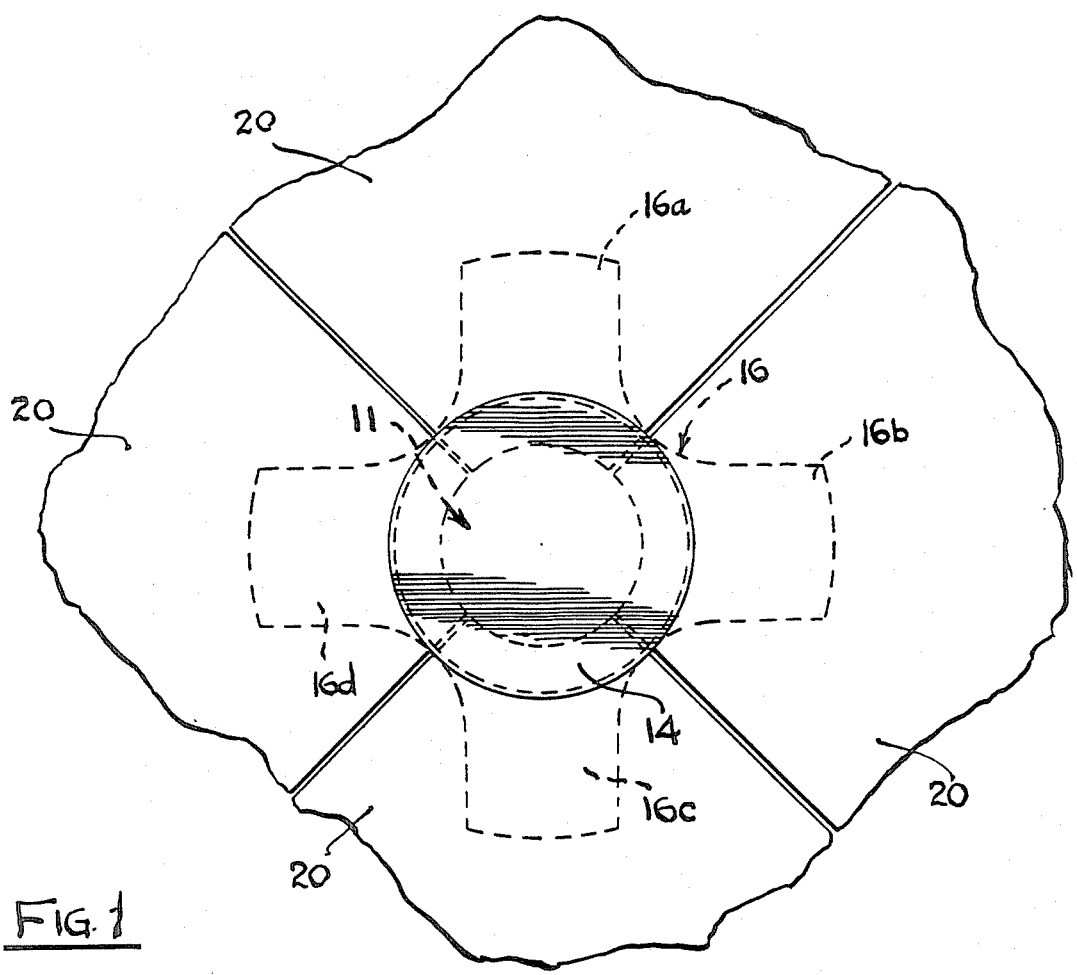
FIG. 1 is a bottom plan view of a preferred embodiment of the invention shown in use joining four panels together.
Figure 2:
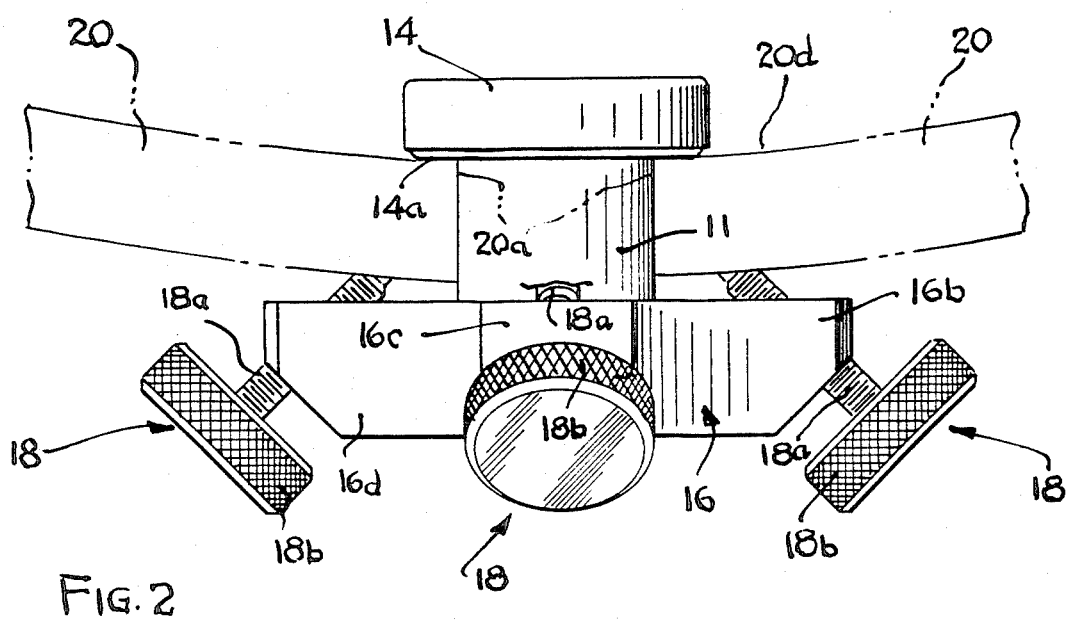
FIG. 2 is a side elevational view of the preferred embodiment.

Referring now to the figures, a preferred embodiment of the invention is illustrated. The preferred embodiment comprises a central cylindrical hub section 11. Extending transversely from one end of central hub section 11, is an overlapping cylindrical holder member 14. Extending from the other end of central hub portion 11 is a second overlapping member 16 which includes four finger portions 16a-d which are oriented at 90 degree intervals around member 16. Each of finger portions 16a-d has a clamp member 18 which extends therethrough and which is threadably engaged therewith. Each clamp member 18 has a threaded arm portion 18a and a knob portion 18b, the arm portions threadably engaging a mating threaded portion of an associated aperture 16e formed in each of finger portions 16a-d. Apertures 16e are angled inwardly towards each other at a convergent angle so that arm portions 18a, likewise, converge towards each other when knobs 18b are rotated in a clockwise direction. A cylindrical shoe, 18c, is fixedly attached to the end of each arm 18a to provide a suitable clamping surface.

Figure 3:
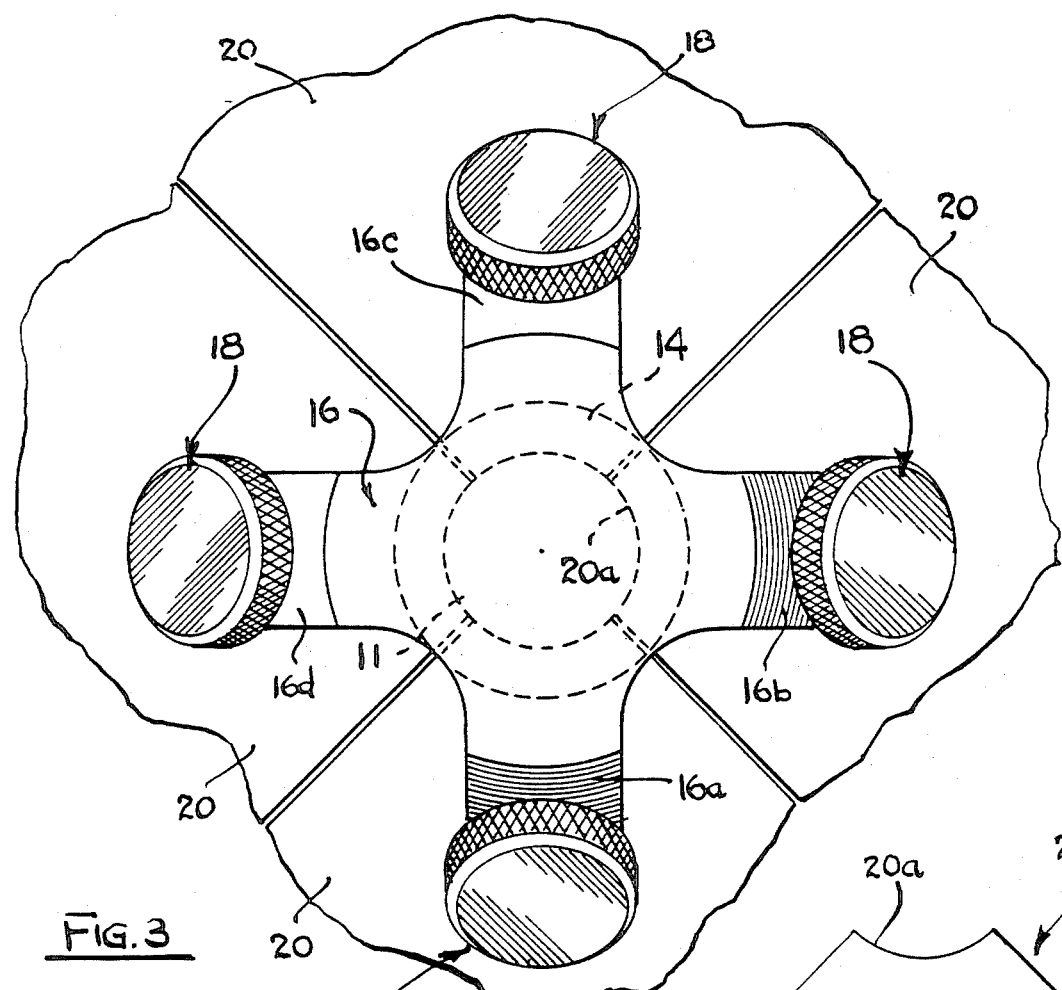
FIG. 3 is a top plan view showing one of the devices of the invention in use in joining four panel sections together.
Figure 3A:
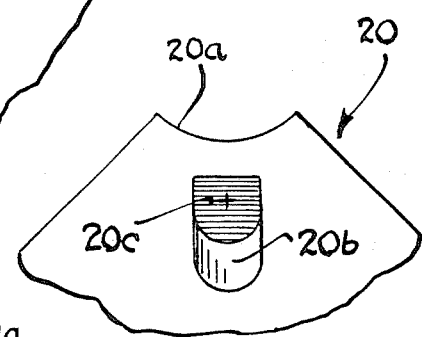
FIG. 3A is a fragmentary view showing a notch formed in a panel section for use in receiving one of the clamps employed in the device of the invention.
Figure 4:
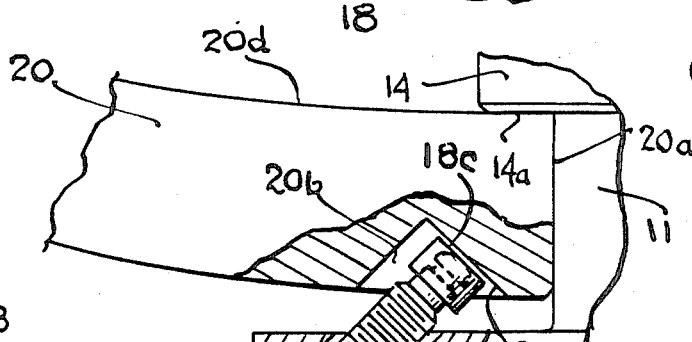
FIG. 4 is a side elevational view in partial cross section showing one of the clamps of the invention in use in clamping a panel.

A plurality of panels 20, which may be joined to each other by the fastener of the present invention are illustrated in FIGS. 1 and 3. Such panels each has a corner 20a, the shape of this corner being such as to match the surface of hub portion 11 (in this instance, being in the form of a segment of a circle). Further, a notch 20b is formed in the surface of the panel opposite overlapping portion 16, this notch being angulated to match the converging angle of arm portion 18a (i.e., such that shoe portion 18c will abut flush against surface 20c of the notch).

As can be seen, the arcuate chamferred portions 20a abut in flush engagement against the surface of hub portion 11 with the shoe portions 18c in clamping engagement against the notched surfaces 20c, and surface 14a of the holder member 14 in abutment against surfaces 20d of the panels, thereby retaining the four sections together. It is to be noted that the panel surfaces 20d of the panels 20 are closely aligned with each other by virtue of their abutment against the common surface 14a.

Figure 5:
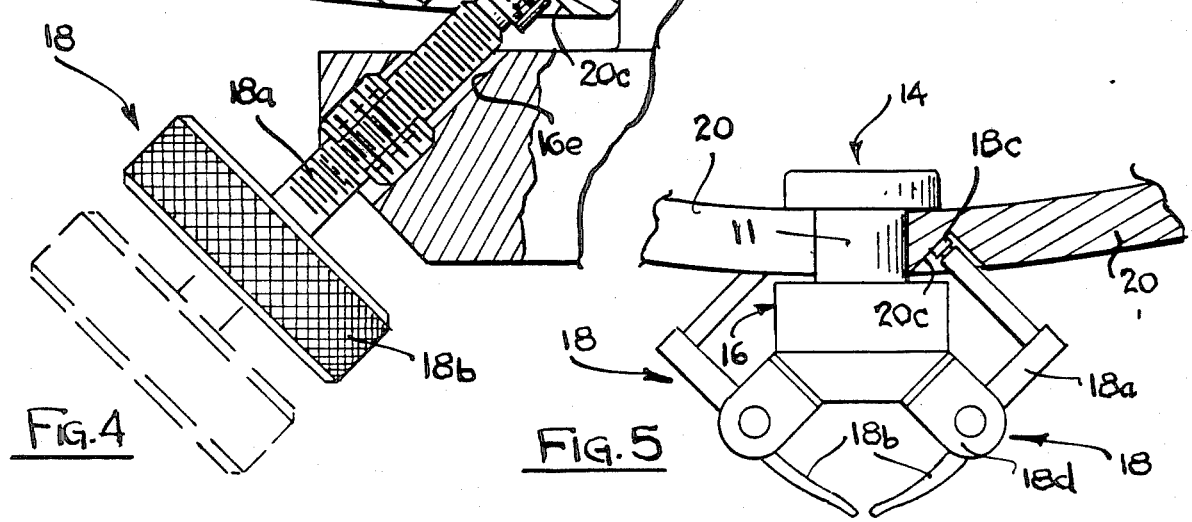
FIG. 5 is a side elevational view of a second embodiment of the invention.

Referring now to FIG. 5, a second embodiment of the invention is illustrated. This second embodiment functions in the same general manner as the first but employs a toggle clamping mechanism rather than the screw clamp of the first embodiment. Toggle clamps 18 are fixedly attached to the main body of the clamp and have toggle arms 18a which are pivotally mounted on support portions 18d of the clamps. The shoe portions 18c of the toggles are brought into clamping engagement with notched surfaces 20c by manipulation of the toggle arms by means of handle portions 18b. The panel sections are thus clamped together in the same general manner as for the first embodiment. Toggle clamps 18 may be commercially available clamps such as type CL-350-HTC manufactured by Carr Lane Manufacturing Co., St. Louis, Mo.

Overlapping members 14 and 16 could take other configurations and in certain designs section 16 need not overlap the panels. In addition, the shapes of the corners 20a of the panels and the surface of hub portion 11 could have shapes other than the arcuate shape shown.

While the invention has been described and illustrated in detail, it is to be clearly understood that this is intended by way of illustration and example only and is not to be taken by way of limitation, the spirit and scope of the invention being limited only by the terms of the following claims:

I claim:

1. A fastener for joining together a plurality of panel members at their corners, said panel members having opposite surfaces, said fastener comprising:

a central hub portion, the panel corners being shaped to matingly engage said hub portion;

an overlapping portion extending transversely from one end of the central hub portion, said overlapping portion abutting against one of the surfaces of said panels; and a separate clamp member for joining each of the panels to the fastener, each of said cheap members comprising an arm portion having an end, a notch being formed in the surface of said panels opposite said one of the surfaces thereof, the ends of said arm portions each being fitted into an associated one of said notches, and means for separately tightening each of said arm portions against the surfaces of said notches such that the panel corners are driven towards each other and in tight abutment against the hub portion and the overlapping portion.

2. The fastener of claim 1 and further including a second overlapping portion extending transversely from the end of said central hub portion opposite to said one end thereof, said second overlapping portion being in opposing relationship to the surfaces of said panels opposite to said one of the surfaces thereof, a plurality of apertures being formed in said second overlapping portion, each of said arm portions being fitted through a separate one of said apertures.

3. The fastener of claim 1 wherein the central hub portion is cylindrical, the panel corners being shaped in the form of a segment of a circle.

4. The fastener of claim 3 wherein the first overlapping portion is cylindrical in shape.

5. The fastener of claim 2 wherein the second overlapping portion comprises a plurality of radially extending finger portions, there being a finger portion for each of said panels, the apertures through which the arm portions extend being formed in said finger portions.

6. The fastener of claim 5, wherein the apertures and arms are threaded and matingly engage each other.

7. The fastener of claim 1 wherein said clamp members comprise toggle clamps.

* * * * *